Patented Sept. 7, 1937

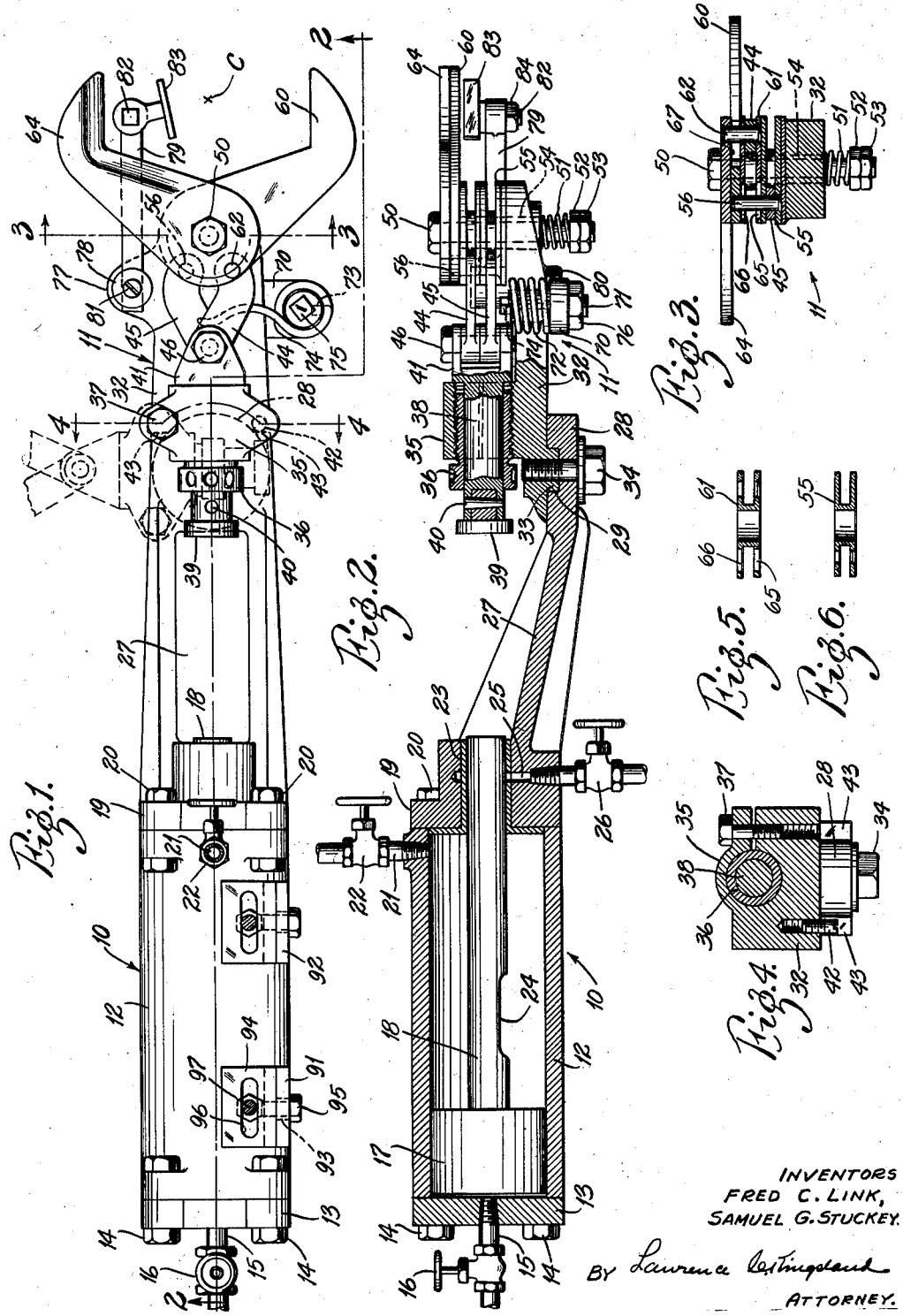

2,092,650

UNITED STATES PATENT OFFICE 2,092,650

GLASS CUTTING SHEARS

Fred C. Link, East St. Louis, Ill., and Samuel G. Stuckey, St. Louis, Mo., assignors to Obear-Nester Glass Company, St. Louis, Mo., a corporation of Missouri Application August 1, 1935, Serial No. 34,158

23 Claims. (Cl. 49—14)

This invention relates to shears and in particular to shears that are adapted for use in connection with glass machinery.

In this machinery, ordinarily a gob of molten glass is extruded from an orifice in the forehearth. This depending gob of glass is severed immediately adjacent the orifice after which it may fall into a parison mold or some other suitable mechanism for further treatment. In such an arrangement as this and, for reasons that are well-known in the art of glass making, it is frequently desirable that the shears be located very close to the orifice. Timing mechanism is provided to synchronize the operation of the shears with the extruding or feeding mechanism, whatever type of such mechanism may be employed. Consequently, it will be understood that the shears act intermittently.

In view of the fact that these operations are performed on molten glass, it will be understood that the temperature surrounding the shears is very great. This, coupled with the fact that the space for working is very small, necessitates dismantling of the shear device whenever adjustments or replacements are required.

Hitherto shears have been made up with the operating mechanism and the cutting blades as a unit. The operating mechanism may be an air operated piston or the like. Consequently when adjustments were required, the entire assembly, including the piston, had to be removed from its mounting and replaced or repaired. Such operation was difficult and costly with respect to time, since the re-installation required careful adjustment in the location of these heavy devices.

It is an object of this invention to provide broadly a shear structure in which operations may be performed on the cutting elements without effecting the operating mechanism.

More specifically, it is an object to provide a cutting mechanism that is readily removable from the operating mechanism.

It is a further object to provide a cutting mechanism that may be moved from position under the forehearth without requiring change in the mounting of the operating structure.

It is a further object to provide a shear structure, the cutting mechanism of which may swing around from beneath the forehearth without dismounting the same from the operating mechanism.

It is an object of the invention to provide a unitary cutting mechanism assembly that is removable as a unit from the operating mechanism.

It is a further object of the invention to provide means for relative adjustment between the cutting mechanism and the operating mechanism.

It is an additional object in the above combination to provide an adjustable mounting for the entire structure.

With these and other objects, that will appear from the following discussion, in view reference is made to the accompanying drawing, wherein, Fig. 1 is a plan view of the device.

Fig. 2 is a view partially in section taken partly on the line 2—2 of Fig. 1.

Fig. 3 is a curvilinear section on the line 3—3 of Fig. 1.

Fig. 4 is a section on the line 4—4 of Fig. 1.

Fig. 5 is a center line section of a disc member to be described in detail hereinafter; and Fig. 6 is a central section of a second disc member to be described in detail.

The device may be generally divided into two sections, section 10 constituting the operating structure or mechanism, and section 11 the cutting structure or mechanism. It will be observed that the cutting structure is mounted on the operating structure, as will be described more fully hereinafter.

In the illustration shown here, the operating mechanism is an air piston. Of course, it will be understood that any analogous mechanism could be used. An air cylinder 12 is provided, having a cylinder head 13 mounted thereon as by bolts 14. Extending through this head, there is an air passage 15 controlled by an adjustable valve 16. A piston 17 having a piston rod 18 is mounted within the cylinder. To the end of the cylinder opposite the head 13 is secured a closure or head 19 secured to the cylinder as by bolts 20. Leading into the cylinder adjacent to the head 19, is an air passage 21 controlled by an adjustable valve 22. It will be seen that the piston rod 18 reciprocates through an opening in the head 19, a bushing 23 being provided for the rod. The stroke of the piston in which it moves to the right, as shown in the drawing, is the application stroke. Hence, when pressure is admitted through the passage 15, the size of which is controlled by the valve 16, the piston will move to the right. The size of the passage 15 determines the speed of this motion. As this takes place, air is exhausted from the return side of the piston through the passage 21. In view of the fact that the passage 21 is more or less restricted in size by the adjustment of the valve 22, means have been provided to completely exhaust the return side of the cylinder at the time the cutting takes place. To effect this, a grooved port 24 is provided in the piston rod. As will be shown hereafter, the cutting takes place during the last portion of the application stroke of the piston. To speed this cutting operation, the return side of the cylinder is completely exhausted when the port 24 registers with a supplemental outlet 25. This outlet is provided with an adjustable valve 26 for its control.

Extending from the cylinder head 19 is a support member 27. While the shape of this support member may vary, it is here shown as being generally a diminishing channel section with lateral ribs and a vertical rib on the bottom thereof. This extension 27 ends in a table 28 having a smooth upper surface. In the center of this upper surface is a counterbore 29. The structure thus far described is peculiarly the operating mechanism. The cutting mechanism will now be described.

The cutting mechanism includes a cutter base 32 having a circular boss 33 engaging for rotation in the counterbore 29. It will be seen that the cutter base 32 is mounted on and extends over the table 28. A bolt 34 passes through a suitable bore in table 28 and is threaded into the cutter base 32. This bolt adjustably maintains the cutter base and cutter structure on to the extension 27.

A boss 35 extends upwardly from the cutter base 32. This boss has a threaded bore therein, into which is screwed a sleeve 36. For reasons to be shown hereafter, this sleeve may be threaded into or out of the boss 35 to a proper point of adjustment. The boss 35 comprises a split sleeve and machine screw 37 is employed to tighten the split sleeve and maintain the inner sleeve 36 in its position of adjustment.

Reciprocable within the inner sleeve 36 is a plunger 38. Inserted in one end of this plunger is a hardened head 39 that is secured to the plunger as by a taper pin 40. As will be shown hereafter, the piston 18 strikes the head 39 and reciprocates the plunger. On the opposite end of the plunger 38 is a bifurcated head 41. For reasons to be shown, a stop pin 42 is threaded into the lower end of the boss 35 either in the same hole into which the screw 37 engages, or to a corresponding hole on the other side of the boss. This stop pin engages one of the shoulders 43 on table 28.

Two arms 44 and 45 are pivoted between the two prongs of the head 41 by means of a bolt 46. The arms 44 and 45 may swivel freely about the bolt 46. As shown in more detail in Fig. 3, the arms 44 and 45 engage discs and pins for operation of the shear blades. Extending through the outer end of the cutter base 32 and the cutter blade structure, shortly to be described, is a pivot bolt 50. The bolt is headed at its upper end and has a spring 51 about its lower end, the spring being held in a suitably adjusted position by means of an adjusting nut 52 and a lock nut 53. The spring engages against a hardened bushing 54 that is pressed into the cutter base 32, and projects upwardly therefrom.

The cutter base 32 terminates at its outer end in a disc-like surface. Mounted for rotation on this surface about the bolt 50 and its bushing 54 is a collar 55 (Fig. 5). Between the flanges of this collar there is mounted a pin 56, (Fig. 3) around which pin the arm 45 is engaged. At its upper end, this pin engages in a suitable opening in the shear blade 60 and transmits the motion of the arm 45 to the blade 60. Mounted over the collar 55 is a similar collar 61 that supports a pin 62 engaged by the arm 44. At its upper end the pin 62 engages the shear blade 64 in a suitable opening therein. It will be observed that the collar 61 is provided with clearances 65 and 66 respectively to permit oscillation of the pin 56 relative thereto. Likewise, the shear blade 60 is provided with a clearance 67 to permit oscillation of the pin 62 relative thereto.

Extending from the cutter base 32 to one side is a projection 70 that may be secured to the underside of the cutter base by bolts or the like or, if desired, may be made integral therewith. A spring stud 71 is threaded into the projection 70. The upper end of the stud 71 is enlarged to form a shoulder engaging against the upper portion of the projection 70, and is encircled by a spring 72. The lower end of the spring 72 is bent as at 73 (Fig. 1) so as to enter into and be retained in a hole drilled in the stud 71. The upper end of the spring has an extension 74 leading to and bearing against the lower end of the bifurcated head 41 and urges the head toward the piston rod 18. The upper end of the spring stud 71 is squared as at 75 for a wrench hold. A locking nut 76 is threaded onto the lower end of the spring stud 71 in order to draw the shoulder thereof against the projection 70, and thereby secure the stud 71 and the spring 72 in adjusted position as will be shown.

A lug 77 (Fig. 1) extends from the other side of the cutter base 32. The lug 77 is drilled to receive rotatably the lower end of a stud 78, the upper end of which is enlarged, to form a shoulder resting upon the lug 77. A horizontal bar 79 extends through a suitable passage in the stud 78. A nut 80 is threaded over the lower threaded portion of the stud 78 that projects below the lug 77. When the nut 80 is loose, the bar 79 may be rotated to the proper angular position about the center of the stud. When so adjusted, it may be secured in position by tightening the nut 80. Likewise it may be secured in proper position of reciprocation in the stud 78 by a set screw 81. The outer end of the bar 79 is drilled to receive a clamping bolt 82 to which is secured a bumper 83. This clamping bolt provides a pivot for the bumper 83 that may be secured in the proper position of adjustment by the nut 84.

The entire structure is mounted from above and may, for example, be suspended from the forehearth. In order to provide an adjustable mounting for it, lugs 91 and 92 are extended upwardly from the cylinder 12. As they are identical, only one will be described. The lug 91 is provided with a vertical slot 93. A complementary lug 94 of L-shaped cross section is secured to the lug 91 by a nut 95 that extends through the slot 93 and is threaded into one flange of the L-shaped lug 94. This causes the other flange of the said lug 94 to extend horizontally. This latter portion is provided with a slot 96 through which extends a bolt 97 that may be threaded into the forehearth or other structure upon which the device is mounted. It will be seen, then, that by loosening the machine screws 97, the device may be adjusted in a horizontal plane by means of the slot 96. Likewise it may be adjusted in a vertical plane by means of the bolt 95 and the slot 93.

*The operation of the device*

The device operates as follows:

Air is supplied through the passage 15 and at the same time the passage 21 is open to exhaust.

The piston 17 is thereby forced to the right, extending piston rod 18 to project from the head 19. Toward the end of its stroke, it will engage the head 37 of the plunger 38, forcing the plunger to the right. This, of course, moves the bifurcated head 41 of the plunger 38 to the right carrying with it the pivot 46. As the pivot 50 is maintained stationary, the arms 44 and 45 are spread by the outward movement of their pivot 46. The arms being engaged with the pins 62 and 56 respectively, the said pins are caused to move arcuately and oppositely about the pivot bolt 50. Since the pins are secured to the shear blades, the shear blades are caused to come together and slightly overlap in severing relation to cut off the gob of glass that is suspended from the forehearth at a point C.

Referring back to the piston 17 that has produced the above described movements of the various parts, it will be observed that at the time the piston rod engages the plunger head 39, the grooved port 24 in the rod will have registered with the supplemental outlet 25 in the cylinder head 19, whereupon all the air remaining in the return side of the cylinder is immediately exhausted through the said outlet, whereupon the actual operating portion of the piston stroke will be speeded up to obtain a quick operation of the shears, thus rapidly separating the glass.

As soon as the shears are thus closed, the timing mechanism converts the passage 21 into an inlet passage and the passage 15 into an outlet passage. When this takes place, air enters the return side of the cylinder and forces the piston to the left, the air on the application side exhausting through the passage 15. When the piston rod 18 retracts from the plunger 38, the extension 74 of the spring 72 acting against the bifurcated head 41 of the plunger 38 forces the plunger back to the left, opening the shears and resetting the device for a subsequent operation.

The bumper 83 is provided to prevent the lower shear plate from pushing the suspended gob of glass out of its proper vertical position, and hence out of alignment with the parison mold into which it drops when severed.

The adjustment of the device

As has been stated, the operation of the device is timed by any suitable timing mechanism, illustrations of which may readily be found in the art. However, individual control of the timing of the shears may be had by adjustment of the several valves 16, 22 and 26. These adjustments provide means for attaining the proper synchronization of the shears with the operating mechanism, that may include, for example, a series of cams. It is understood that such adjustment, per se, is old in the art.

When it becomes necessary to perform such operation on the shears as cleaning them or sharpening them, two provisions are made for such operations. It has been previously pointed out that the shears are originally located very close beneath the forehearth, which precludes any repairing on them when they are in position. In the present structure, they may very easily swing to a position wherein they are accessible for such repairs, and it is not necessary that the operating structure be touched, in order to obtain these results.

By loosening the machine screw 34, the entire cutter base member 32 may be rotated on the plate 28 about this screw 34 to the position shown in dotted lines in Fig. 1 it being stabilized in such movement by the boss 33 engaging in the counterbore 29. In this position, it will be away from the orifice of the forehearth and accessible for repairs. It may be returned to operating position upon completion of the repairs or adjustments. In such return, the stop 42 will engage against the shoulder 43 on the table 28 and this engagement will automatically align the cutter base 32. The stop 42, as has been mentioned, is threaded into the cutter base 32, either in the same opening as the machine screw 37 or an opening on the opposite side of the boss 35 corresponding to this. It is, of course, manifest that the selection of the side in which the stop 42 is located determines the direction in which the shear structure may swing on the plate 28.

Where the work to be done upon the cutter structure is extensive, the bolt 34 may be removed entirely and the entire cutter structure taken off. It will be seen that this removal requires no upward movement other than enough to free the boss 33 from the counterbore 29. Consequently, this removal may be effected without requiring lowering of the operating mechanism at all. Where it is desired not to delay the glass making process until the shears can be repaired, additional cutter mechanisms corresponding to the one removed may be supplied and one installed on the plate 28 in short order. This operation requires only the removal of a single screw and, with the device aligned by virtue of the stop 42 and the shoulder 43, the necessity of the careful remounting of the entire structure with its minute adjustments of the supports 91 and 92 is eliminated. It is evident that this is a greatly simplified procedure.

During the course of time, the shear blades will necessarily have to be sharpened many times. This repeated sharpening may retract the cutting edges of the blades until they no longer overlap. To compensate for this the adjustment including the sleeve 36 is provided. The clamping bolt 37 may be loosened. When this is done, the sleeve 36 may be threaded further into the boss 35, moving therefore to the right as shown in the drawing. The extent of the movement of the plunger 38 under pressure of the piston rod 18 is determined by the position of the head on the sleeve 36. In other words, the plunger will move to the right only until the head 39 contacts with the sleeve 36. Consequently, if the sleeve 36 is adjusted further to the right, the plunger 38 may move further to the right and consequently a sufficient angular movement will be imparted to the shear blades to cause them to overlap despite this wear. It will be understood that as soon as the proper adjustment of the sleeve 36 is obtained, the screw 37 is tightened again to maintain this adjustment.

The speed of opening of the shear blades after a cutting operation is determined by the tension of the spring 72. This tension may be varied by loosening the nut 76 about the bottom of the spring stud 71, then applying a suitable wrench to the square head 75 of the spring stud 71 and rotating the stud counterclockwise. When the proper tension (or torsion) is obtained, the nut 76 is once again tightened to maintain this adjustment.

The speed of closure of the shear blades is controlled by the valve 26, that in turn controls the exhaust of air out of the supplemental port 24. This is employed to prevent too rapid closure, that would soon pound the shears to pieces.

The adjustment of the bumper bar 82 is provided to accommodate the different sizes and shapes of the gobs of glass. These sizes and shapes are generally dependent upon the configuration of the object being made of the glass but it will be seen that where a thick gob is being cut, the bumper bar 82 will be moved further away from the center point C. It may also be moved axially of the rod 79 to further accommodate for these different sizes.

From the above description, it will be seen that a flexible shear structure has been provided that accomplishes the objects previously set forth.

Having described the invention, what is claimed is:

1. In a device of the kind described, a cutter mechanism, said cutter mechanism including cutting means and reciprocating means for producing cutting movement of the said cutting means, an operating mechanism including means for actuating said cutter mechanism, and means rotatably mounting one of said mechanism on the other.

2. In a device of the kind described, a cutter mechanism, said cutter mechanism including cutting means and reciprocating means for producing cutting movement of the said cutting means, an operating mechanism including means for actuating said cutter mechanism, said cutter mechanism and said operating mechanism being fabricable as separate units, and means removably attaching said cutter mechanism to said operating mechanism.

3. In a device of the kind described, an operating mechanism including a movable part, support means on said operating mechanism, a cutter mechanism unit, means mounting said cutter mechanism as such unit on said support, said cutter mechanism unit including blade means, devices for producing cutting movement of the blade means, said devices including a reciprocable element engageable intermittently with the aforesaid movable part of said operating mechanism whereby the latter operates the cutter mechanism.

4. In a device of the kind described, an operating mechanism including a part movable to project varying distances from said mechanism, a cutter unit, cutting means on said cutter unit, a reciprocable member mounted on said cutter unit for limited movement for actuating said cutting means, said reciprocable member being adapted to be engaged and operated by said movable part of said operating mechanism, whereby said movable part actuates said cutting means, and means for varying the distance said reciprocable member can move on said cutter unit in its actuation of said cutting means.

5. In a device of the kind described, an operating mechanism including a reciprocable part, a support on said mechanism, a cutter mechanism unit mounted on said support, a reciprocable member included in said cutter mechanism and adapted to be reciprocated on said mechanism by intermittent contact of the reciprocable part of the operating mechanism, and means adjustably limiting the amount of movement of said reciprocating member.

6. In a device of the kind described, a cutter mechanism, an element mounted for reciprocation thereon, means including a stop on said element and a member against which said stop acts to limit the movement of the reciprocating element, and means adjustably mounting the member on said mechanism.

7. In a shear mechanism, cutter means, a reciprocable element for actuating said cutter means, and a base upon which said means and said element are mounted, a stop on said element, and a sleeve surrounding said element, engageable by said stop, and adjustably mounted on said base whereby to limit the movement of said reciprocable member and to vary the extent of such movement.

8. In a shear mechanism, a base, cutter means movably mounted on said base, a boss on the base having a bore therethrough, said boss comprising a split sleeve, a second sleeve adjustably mounted in said split sleeve, and means for tightening the split sleeve to bind the second sleeve in adjusted position, a plunger reciprocable in said second sleeve and having a stop engageable with the sleeve for limiting the movement of the plunger, the adjustment of the sleeve varying the amount of movement permitted, and means for transmitting the movement of the plunger to the cutter means, whereby the latter are actuated in a degree controlled by the aforesaid adjustment.

9. In a shear mechanism, a base, a plunger mounted for reciprocation on the base, a reciprocable member disconnected from the plunger and adapted to actuate the plunger in one direction, adjustable resilient means for returning the plunger, cutter means on the base, and means for transmitting the movement of the plunger to the cutter means to actuate the same to cutting position, and return.

10. In a shear mechanism, a base, a plunger reciprocable in the base, cutting means, means for transmitting the reciprocation of the plunger to the cutting means to actuate the same, a torsion spring for moving the plunger in one direction, and means for adjusting the torsion of the spring to vary the pressure on the plunger.

11. In a shear mechanism, a base, a plunger reciprocable on the base, cutting means, and means connecting the plunger to the cutting means whereby reciprocation of the former actuates the latter, a torsion spring, a mounting on the base for said torsion spring, including a rotatable stud to which one portion of the spring is attached, another portion of the spring engaging and pressing against the plunger, rotation of the stud being adapted to adjust the pressure on the plunger, and means for securing the stud in rotated position.

12. In a shear mechanism, a pair of contiguous oscillative shear blades, a pivot about which they oscillate, a pair of discs, both on the same side of both said blades, a pin in each disc, one pin engaging the first blade, and the other pin engaging the second blade whereby oscillation of the discs operates the blades, one of said pins crossing the other of said discs, the second pin crossing the first blade, and said crossed disc and said crossed blade having clearances to permit movement of the respective pins relative thereto.

13. In a device of the kind described, an operating mechanism, a cutter mechanism including cooperatively movable shear blades and means for moving said blades, and means comprising a single bolt for removably mounting the cutter mechanism on the operating mechanism.

14. In a device of the kind described, an operating mechanism including a support, a cutter mechanism including a base, said cutter mechanism further including cooperatively movable shear blades and means for moving said blades, said means being unconnected to said operating mechanism yet being adapted to be actuated thereby to move said blades, and a single pin means removable from below for securing the cutter base to the support.

15. In a device of the kind described, an operating mechanism including an operating member, a support on said operating means, a cutter mechanism including an element moved by said operating member, said operating member and said element being disconnected, and removable means for mounting the cutter mechanism on the support whereby the same may be removed from said support as a unit.

16. In a device of the kind described, an operating mechanism, a support on said operating mechanism having a plane surface, a cutting mechanism including cooperatively movable blades and means for moving said blades, said support and said cutting mechanism being provided with a boss and counterbore interlock to permit pivoting of one with respect to the other, and a removable fastening device for securing said boss in said counterbore.

17. In a device of the kind described, an operating mechanism having an air piston and piston rod, a support on said mechanism, a cutter mechanism removably mounted on said support, said cutter mechanism including movable cutter means, and mechanism including a reciprocable member for transmitting the reciprocation of the piston rod into movement of the cutter means, said last means being disconnected from the piston rod, and being adapted to be reciprocated by said rod during at least a portion of the stroke thereof.

18. In a device of the kind described, an operating mechanism including an air cylinder, piston and piston rod, a support on said mechanism, a cutter mechanism mounted on said support and having a reciprocable element adapted to be moved by said piston rod, said rod and said element being disconnected, said rod engaging said piston during a portion of the stroke of the latter, and valve means effective during such time of contact opening the side of the cylinder ahead of the piston rod to exhaust.

19. In a device of the kind described, an operating mechanism having a support thereon, a cutter mechanism pivotally mounted on said support, said cutter mechanism including cooperatively movable blades and means for moving said blades, and stop means interengaging between said support and said cutter mechanism arresting the pivoting of the latter when the said means for moving said blades is properly aligned with the operating mechanism.

20. In a device of the kind described, an operating mechanism, a cutter mechanism removably mounted thereon, said cutter mechanism including a member adapted to be actuated in two directions, in one of which it is actuated by the operating mechanism, means fixedly limiting its actuation in one direction, and adjustably limiting its actuation in the other.

21. In a shear device, an operating mechanism, said mechanism including a member adapted to be projected and retracted therefrom, a cutter mechanism assembled as a unit and adapted to be secured to said operating mechanism, said cutting mechanism unit including cutter blades, mechanism responsive to action of the member projected from the operating mechanism for actuating the blades, and mechanism for returning the blades.

22. In a device of the kind described, a cutter mechanism, said cutter mechanism including a base, a plunger reciprocable in an adjustable sleeve supported by the base, an impact head at one end of the plunger, spaced prongs at the other end of the plunger, a pair of links pivoted between the prongs, each link at its other end being pivoted to a disc member, said disc members being superposed and positioned for rotation about a common pivot, and a shear blade pivoted to each disc member for oscillative operation therethrough.

23. In a shear mechanism, an operating mechanism, a cutter mechanism comprising a detachable unit including shears and means adapted to be actuated by said operating mechanism for closing and opening the same, and a single removable means for operatively attaching said cutter mechanism to said operating mechanism.

FRED C. LINK.
SAMUEL G. STUCKEY.